United States Patent
Singh et al.

(10) Patent No.: US 10,802,281 B2
(45) Date of Patent: Oct. 13, 2020

(54) PERIODIC LENSES SYSTEMS FOR AUGMENTED REALITY

(71) Applicant: General Electric Company, Schenectady, NY (US)

(72) Inventors: Baljit Singh, Boston, MA (US); Ratnadeep Paul, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 11 days.

(21) Appl. No.: 16/227,461

(22) Filed: Dec. 20, 2018

(65) Prior Publication Data
US 2020/0201044 A1    Jun. 25, 2020

(51) Int. Cl.
G09G 5/00          (2006.01)
G02B 27/01         (2006.01)
G09G 3/20          (2006.01)

(52) U.S. Cl.
CPC ........... G02B 27/0172 (2013.01); G09G 3/20 (2013.01); G02B 2027/014 (2013.01); G09G 2310/08 (2013.01)

(58) Field of Classification Search
CPC .... G02B 3/14; G02B 27/0172; G02B 27/017; G02B 2027/0178; G02B 21/004; G02B 26/005; G02B 27/0075; G09G 3/002
See application file for complete search history.

(56) References Cited

U.S. PATENT DOCUMENTS 8,582,209 B1 * 11/2013 Amirparviz .......... G02B 3/0056
                                                   359/630

8,933,965 B2    1/2015 Tomite et al.
2002/0158873 A1  10/2002 Williamson
(Continued)

FOREIGN PATENT DOCUMENTS

| EP | 1060772 A2 | 12/2000 |
| EP | 2724191 A2 | 4/2014 |
| EP | 2920766 A2 | 9/2015 |

OTHER PUBLICATIONS

Large depth of focus dynamic micro integral imaging for optical see-through augmented reality display using a focus-tunable lens, Applied Optics, vol. 57, No. 7, (Year: 2018).*

(Continued)

*Primary Examiner* — Weiming He
(74) *Attorney, Agent, or Firm* — Buckley, Maschoff & Talwalkar LLC

(57) ABSTRACT

An augmented reality device including a transparent display screen and a lens system disposed adjacent to the transparent display screen, a control processor in communication with a data store, the data store including one or more virtual image records. If the lens system is a micro-lens, the control processor provides control commands to the transparent display screen to cause generation of an augmented reality image by interspersing inactive pixels elements with active pixel elements to provide a spatial domain combined image of the real world and virtual images. If the lens system is a focus tunable lens, the control processor provides control commands to the transparent display screen and the focus tunable lens to cause alternating transparent views of the real world image object and virtual image. The alternating of images occurring at frame rate greater that visible by a user's eye(s).

9 Claims, 4 Drawing Sheets

(56) References Cited

U.S. PATENT DOCUMENTS

| | | | |
|---|---|---|---|
| 2013/0021226 A1* | 1/2013 | Bell | G02B 3/0006 |
| | | | 345/8 |
| 2013/0169683 A1 | 7/2013 | Perez et al. | |
| 2013/0328762 A1 | 12/2013 | McCulloch et al. | |
| 2014/0132484 A1 | 5/2014 | Pandey et al. | |
| 2016/0341961 A1 | 11/2016 | Mullins et al. | |
| 2018/0120573 A1* | 5/2018 | Ninan | H04N 13/344 |

OTHER PUBLICATIONS

Jong-Young et al., "See-through optical combiner for augmented reality head-mounted display: index-matched anisotropic crystal lens", Scientific Report, Jun. 2017, 11 pp.

Andrew et al., "Holographic Near-Eye Displays for Virtual and Augmented Reality", ACM Transactions on Graphics, vol. 36, No. 4, Article 85, pp. 01-16, Jul. 2017, 16 pp.

\* cited by examiner

PERIODIC LENSES SYSTEMS FOR AUGMENTED REALITY

BACKGROUND

Augmented reality (AR) overlays virtual image objects/information onto real-world image objects/information and displays the combined AR image in a user's field of view (FOV). Categories of AR technology include Projection AR (the virtual information is projected using external projectors onto the real objects in the user's environment; Handheld AR (the virtual information is displayed on a handheld device—e.g., mobile phones, tablets etc.); and Head Mounted Display (HMD) AR (the virtual information is displayed on an optical head-mounted display—e.g., smart glasses).

Conventional AR HMD displays stereoscopic three-dimensional (3D) objects. Typically, the conventional techniques provide each eye with images from slightly different angles. Television screens and motion picture theaters provide 3D images where the light source is far from the eye, and objects appear in focus. However, in HMD, the display is near-eye, which requires additional optic components to focus objects that are virtually far.

Because conventional 3D augmented reality is generated near the eye, additional optical components are also need to properly focus the image(s). However, AR introduces an additional complexity as the focus of the real-world image objects need to be preserved. Conventional solutions for this problem include wave-guide optics and bird-bath optical combiners. Both these conventional designs suffer from dual competing problems of having a narrow FOV produced by a heavy device that includes a display projector and a display screen.

DESCRIPTION

Embodying systems include a head-mounted, augmented reality device that combines a lens system with a transparent display screen to provide a high field of view in a light weight package. An embodying combination of lens and display screen results in a device that presents an AR image with either a spatial or time periodic component.

Figure 1:
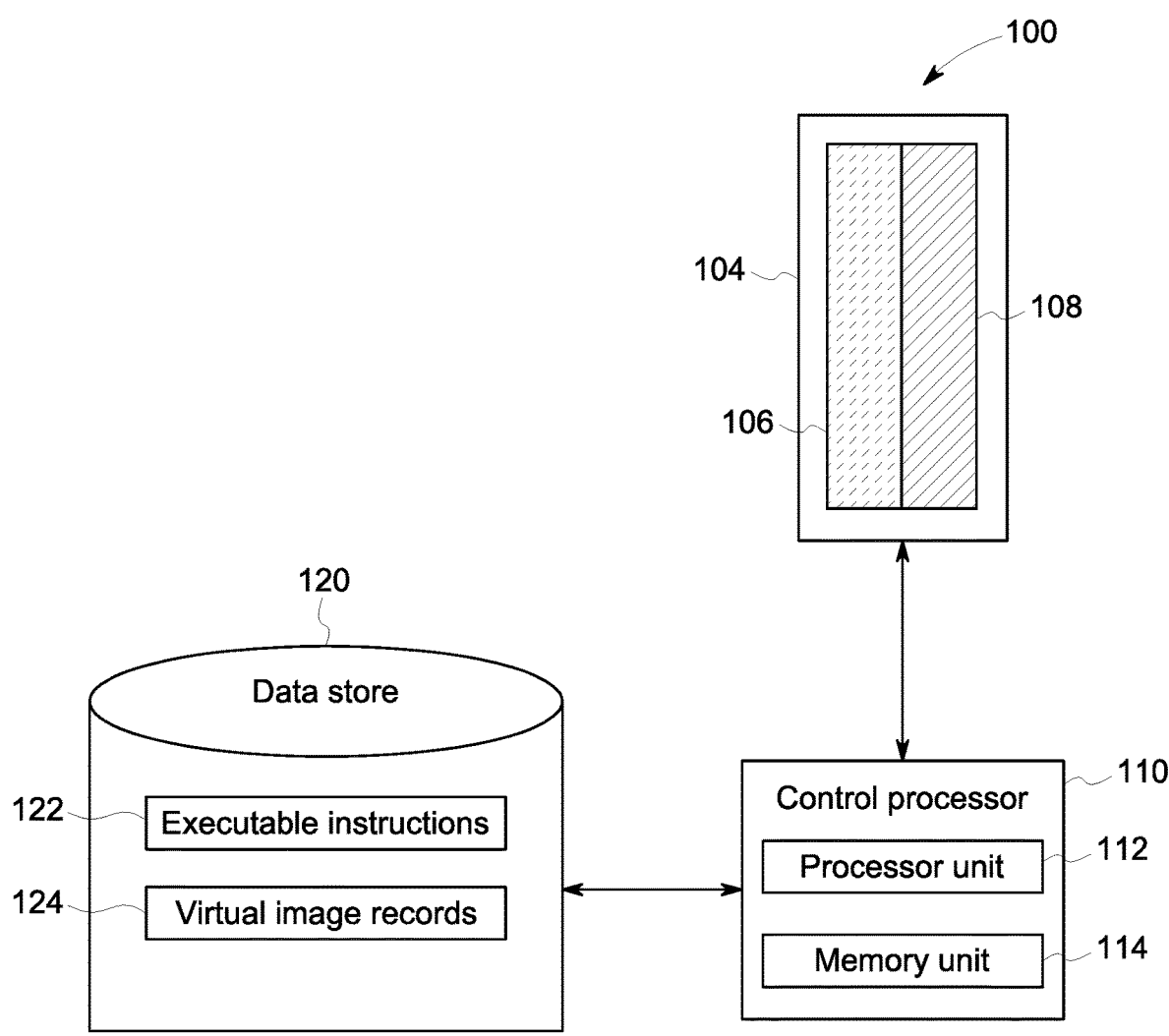
FIG. 1 depicts an AR HMD system in accordance with embodiments.

FIG. 1 illustrates AR HMD system 100 in accordance with embodiments. Display unit 104 includes transparent display 106 and lens system 108. A transparent display includes transistor-controlled pixels that generate an image on a screen, but still allows the user to see what is visible through the display. Lens system 108 can be an active, controllable lens—i.e., when disabled it acts as a transparent window; when enabled it can focus a virtual image generated by the transparent display's pixels.

Control processor 110 can include processor unit 112 and memory unit 114. The control processor can be in direct communication with data store 120. In some implementations, the control processor can be in indirect communication with the data store across an electronic communication network if the data store is located remote from the head-mounted unit. Memory unit 114 can provide the control processor with local cache memory.

Processor unit 112 can execute executable instructions 122, which can cause the processor to access virtual image records 124. The control processor unit provides control of pixels in the transparent display to generate the virtual image. The control processor also provides control signals to the lens system. The virtual image can be combined with a real-world image viewed through transparent display screen 106 to create an AR image.

Figure 2:
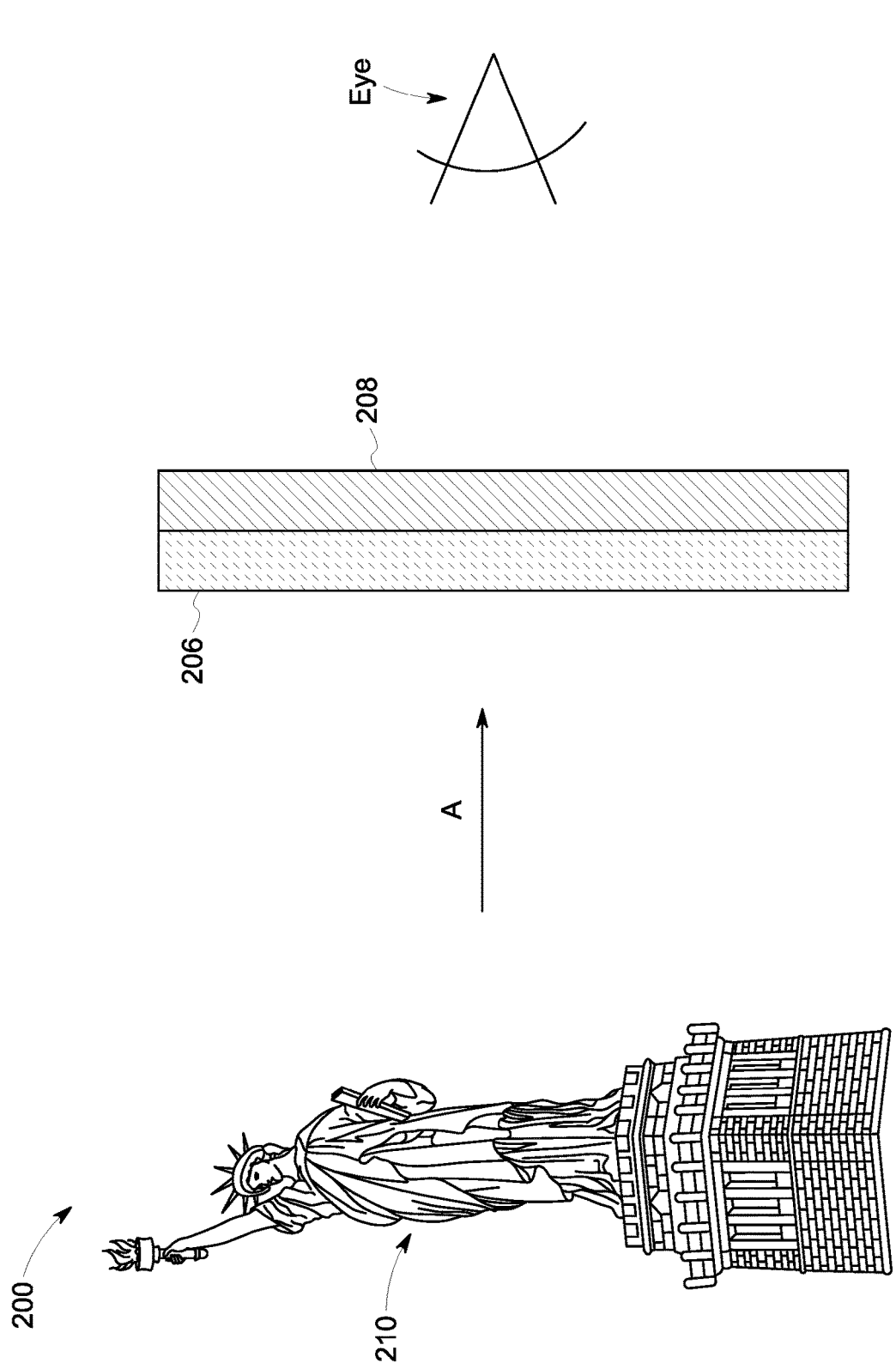
FIG. 2 schematically depicts an AR HMD configuration in accordance with embodiments.

FIG. 2 schematically depicts AR HMD configuration 200 in accordance with embodiments. The figure represents the flow of light through an embodying AR HMD unit into a user's eye(s) (E). The flow of light is from left to right, and represented by arrow (A).

The Statue of Liberty depiction represents real world object 210. Light reflected off the real world object creates an image, which enters the AR HMD unit through transparent display 206. Lens system 208 acts on the real world image to provide an augmented reality view to the user's eye(s).

Figure 3:
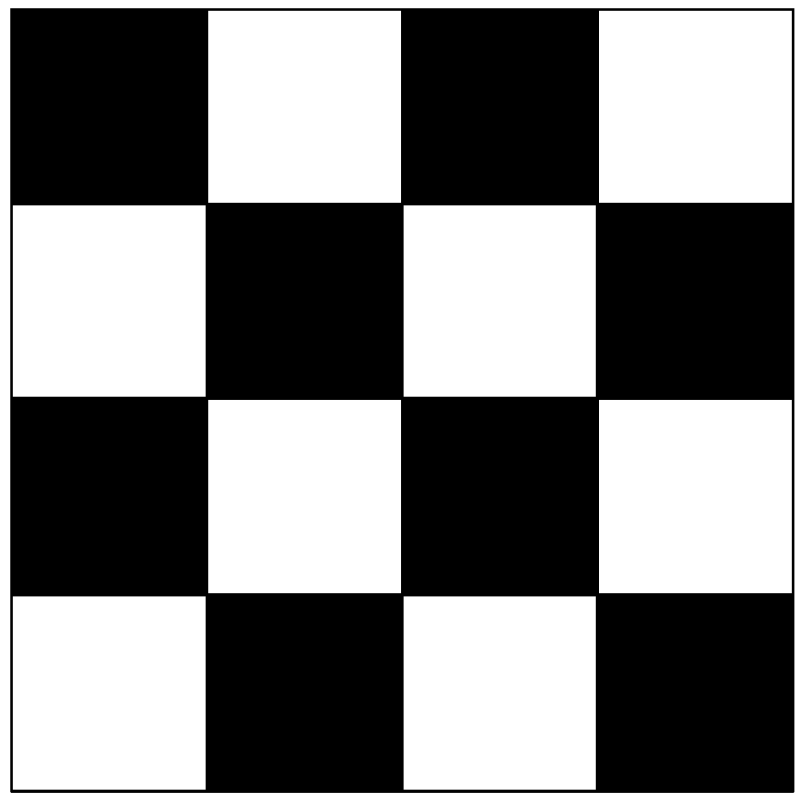
FIG. 3 depicts a lens system for the AR HMD system of FIG. 1 in accordance with embodiments.

In some implementations, lens system 208 can be implemented as a micro-lens positioned between transparent display 206 and a user's eye(s). FIG. 3 depicts a portion of lens system 308 for AR HMD system 100 in accordance with embodiments. Lens system 308 can be a micro-lens pixel array having an appearance of a checkerboard. Each square of the checkerboard represents a pixel of the micro-lens array.

The white box represents a transparent pixel, which allows the real object image's light to pass through to a user's eye(s) unaffected. The black box represents a pixel that is activated to present a portion of selected virtual image 124A. The spatial location of the checkerboard pattern varies with the selected virtual image record. Pixels of the selected virtual image are spatially interspersed with transparent pixels (i.e., non-activated pixels) so that a portion of the real object image light and the selected virtual image reach a user's eye(s).

The micro-lens focuses the virtual image at a distance/infinity. The end result of the combination is an interweaving of virtual image pixels and real world image light through transparent pixels. Because the size of the pixel is smaller in size than what an eye can resolve, the images are fused when consumed by the eye.

In other implementations, lens system 208 can be implemented as a focus-tunable lens. In this implementation, the periodicity of the display is not in a spatial position domain, but in a time-based domain. In accordance with this implementation, the focus-tunable lens is toggled on/off at a high frequency. The frequency of modulation is at a frame rate faster that the frame rate at which a user's eye(s) perceives light—e.g., at a rate of about 30 frames/second or greater.

When the system is off, the real objects image light passes unimpaired through the transparent display. Similarly, when the focus-tunable lens is toggled off, the tunable lens, it acts as window. When the system is on, the transparent display blocks the real light image, and instead each pixel of the transparent display is activated to generate a selected virtual image. The focus tunable lens is toggle on to focus the virtual image. Because the system is toggled on/off at a modulation frequency higher than can be perceived at the user's eye(s), the real world (unimpaired) image and the selected virtual image are interwoven in time. The result of this time-dependent interweaving is that the user's brain perceives the two images as a single image; hence, creating an augmented reality visualization.

Figure 4:
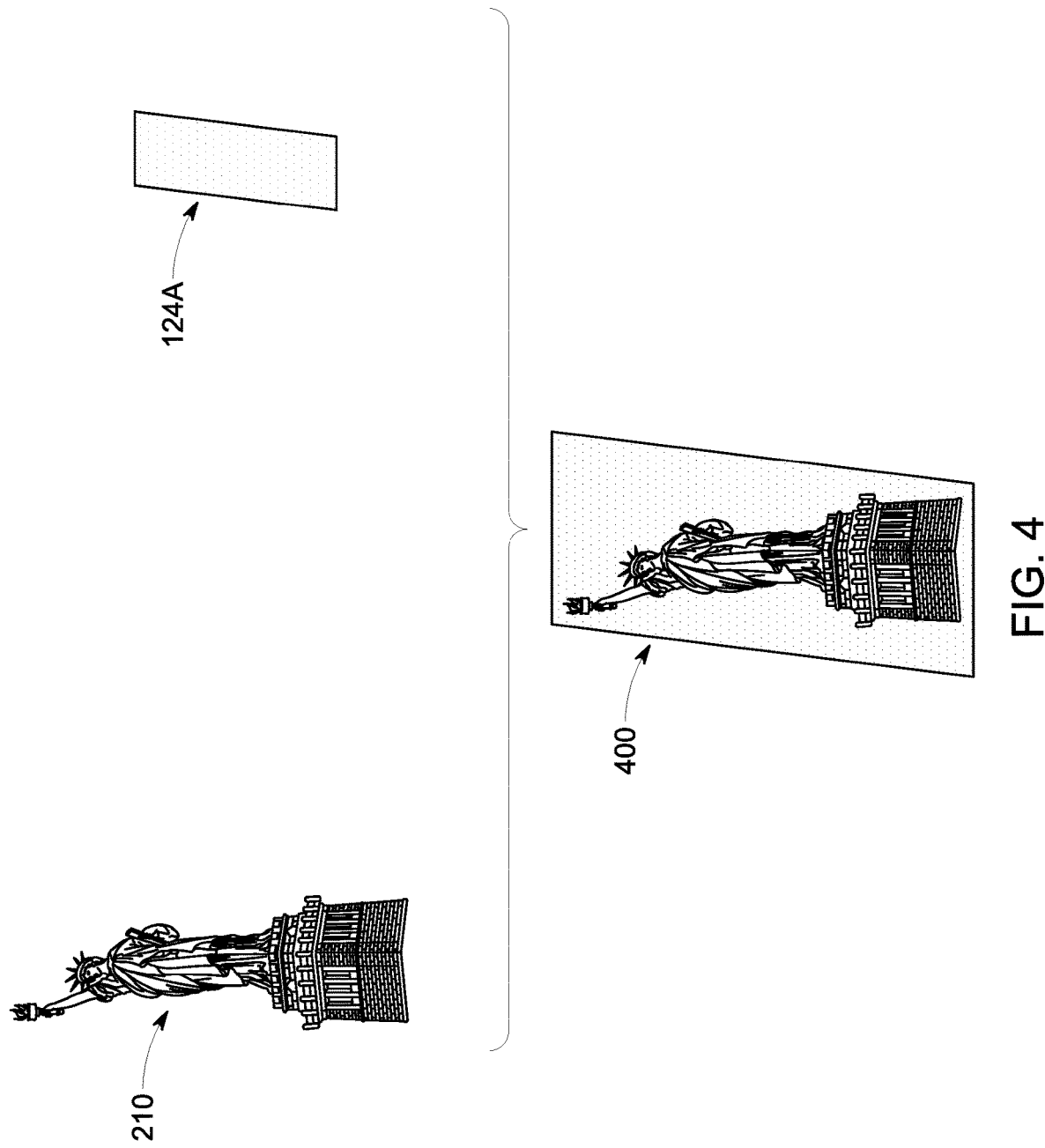
FIG. 4 depicts a simulation of an AR image produced by the AR HMD system of FIG. 1 in accordance with embodiments.

In either implementation (transparent display with microlens, or transparent display with focus-tunable lens), the resulting visual effect on a user's eye is to simultaneously see the two images (real image 210 and a selected virtual image record 124A). FIG. 4 depicts simulated AR image 400 produced by AR HMD system 100 in accordance with embodiments. The image of real world object 210 is interwoven with the selected virtual image 124A to produce the AR image 400.

Embodying AR HMD systems improve over conventional approaches (that use waveguide optics) by implementing a streamlined unit that combines a transparent display screen with a lens element to create an augmented reality image using periodic-alterable features of the combination. Embodying AR HMD systems create an augmented reality image with a field of view greater than conventional approaches, while being scalable to allow for larger visual coverage.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. An augmented reality device comprising:
   a transparent display screen having a matrix of active electronic pixels, the transparent display screen having a first surface positioned to receive real world image light;
   a lens system disposed adjacent to a second surface of the transparent display screen, wherein the lens system includes a pixel array or focus-tunable lens, the focus-tunable lens operative to be toggled between an "on" position and an "off" position at a given frequency;
   a control processor in communication with a data store, the data store including one or more virtual image records;
   the control processor configured to provide control commands to the transparent display screen or the lens system; and
   the transparent display screen and the lens system in combined response to the control commands configured to create an augmented reality image based on one of a spatial domain or time domain periodic component, wherein the augmented reality image based on the spatial domain component is provided via adjacent activated and non-activated pixels in the pixel array and the augmented reality image based on the time domain periodic component is provided via toggling of the focus-tunable lens between the "on" position to generate a selected virtual image and the "off" position to provide real objects.

2. The device of claim 1, including the lens system being a micro-lens.

3. The device of claim 2, the data store including executable instructions that cause the control processor to generate command signals that result in pixels of a selected virtual image record being provided to a first set of electronic pixels, the first set of electronic pixels being interspersed among a second set of electronic pixels, the second set of electronic pixels remaining transparent during activation of the first set of electronic pixels.

4. The device of claim 3, the command signals causing:
   the first set of electronic pixels to shift to a third set of electronic pixels;
   the second set of electronic pixels to shift, in coordination with the shift of the first set of electronic pixels, to a fourth set of electronic pixels; and
   activation of the third set of electronic pixels cause a display of the virtual image to change position on the transparent display screen.

5. The device of claim 1, the lens system being a focus tunable lens.

6. The device of claim 5, the data store including executable instructions that cause the control processor to generate command signals that result in the transparent display screen alternatingly having no activate pixels and having a portion of active pixels presenting a selected virtual image.

7. The device of claim 6, the command signals alternating the pixel activation/non-activation at a modulation rate greater than visible to a user's eye.

8. The device of claim 6, the command signals causing:
   the focus tunable lens to be inactive when the transparent display screen pixels are inactive; and
   the focus tunable lens to be active when the portion of active pixels present the selected virtual image.

9. The device of claim 8, the alternating operation of the transparent display screen pixels and focus tunable lens creating an image of the real world image object and selected virtual image that is interwoven in time.

* * * * *